United States Patent [19]
Narayana et al.

[11] Patent Number: 5,963,056
[45] Date of Patent: *Oct. 5, 1999

[54] FULL AND EMPTY FLAG GENERATOR FOR SYNCHRONOUS FIFOS

[75] Inventors: Pidugu L. Narayana; Andrew L. Hawkins, both of Starkville, Miss.

[73] Assignee: Cypress Semiconductor Corp., San Jose, Calif.

[*] Notice: This patent is subject to a terminal disclaimer.

[21] Appl. No.: 08/661,436

[22] Filed: Jun. 11, 1996

Related U.S. Application Data

[63] Continuation-in-part of application No. 08/572,623, Dec. 14, 1995, Pat. No. 5,627,797.

[51] Int. Cl.$^6$ .................................................. H03K 19/00
[52] U.S. Cl. ............................... 326/96; 326/46; 326/93; 365/221
[58] Field of Search .............................. 326/40, 46, 93, 326/96; 365/189.12, 219, 221

[56] References Cited

U.S. PATENT DOCUMENTS

| | | | |
|---|---|---|---|
| 4,467,443 | 8/1984 | Shima | 395/416 |
| 4,802,122 | 1/1989 | Auvinen et al. | 365/154 |
| 4,833,651 | 5/1989 | Seltzer et al. | 365/189.07 |
| 4,839,866 | 6/1989 | Ward et al. | 365/221 |
| 4,847,812 | 7/1989 | Lodhi | 365/221 |
| 4,864,543 | 9/1989 | Ward et al. | 365/221 |
| 4,875,196 | 10/1989 | Spaderna et al. | 365/238 |
| 4,888,739 | 12/1989 | Frederick et al. | 365/221 |
| 4,891,788 | 1/1990 | Kriefels | 365/49 |
| 4,942,553 | 7/1990 | Dalrymple et al. | 364/900 |

(List continued on next page.)

FOREIGN PATENT DOCUMENTS

| | | |
|---|---|---|
| 0113996 | 8/1989 | Japan . |
| 0676559 | 6/1994 | Japan . |

OTHER PUBLICATIONS

High Speed CMOS 256x36x2 Bi-direction FIFO, QS725420A, MDSF-00018-01, Apr. 24, 1995, pp. 1-36.
High-Speed CMOS 4Kx9 Clocked FIFO with Output Enable, QS7244A, MDSF-00008-05, Jun. 6, 1995, pp. 1-12.
High-Speed CMOS 1Kx36 Clocked FIFO with Bus Sizing, QS723620, MDSF-00020-00, Jul. 17, 1995, pp. 1-36.
Andrew Hawkins et al., U.S.S.N. 08/567,893 State Machine Design for Generating Empty and Full Flags in an Asynchronous FIFO, filed Dec. 6, 1995.
Andrew Hawkins et al., U.S.S.N. 08/567,918 State Machine Design for Generating Half-Full and Half Empty Flags in an Asynchronous FIFO, filed Dec. 6, 1995.
Andrew Hawkins et al., U.S.S.N. 08/577,712 Circuit for Generating Almost Full and Almost Empty Flags in Asynchronous and Synchronous FIFOs, filed Dec. 22, 1995.

(List continued on next page.)

*Primary Examiner*—Jon Santamauro
*Attorney, Agent, or Firm*—Christopher P. Maiorana; Maiorana & Acosta, P.C.

[57] ABSTRACT

The present invention provides an asynchronous state machine with a programmable tSKEW that is used to generate an empty and full flag in a synchronous FIFO buffer. The present invention reduces the delay associated in producing the full or empty flags from a typical eight gate delays, to as little as no gate delays. The present invention accomplishes this by using a set state machine which can only make an internal flag go low, or active, and a reset state machine which can only make the internal flag go high, or inactive. The functioning of the set state machine and the reset state machine is controlled by a blocking logic. The output of each of the state machines is stored in a latch. The output of the latch is presented to an input of the blocking logic, which is used by the blocking logic to control the activity of the state machines.

40 Claims, 5 Drawing Sheets

U.S. PATENT DOCUMENTS

| | | | |
|---|---|---|---|
| 4,985,867 | 1/1991 | Ishii et al. | 365/211 |
| 5,021,994 | 6/1991 | Tai et al. | 364/900 |
| 5,079,693 | 1/1992 | Miller | 395/250 |
| 5,084,837 | 1/1992 | Matsumoto et al. | 395/250 |
| 5,088,061 | 2/1992 | Golnabi et al. | 365/189.01 |
| 5,121,346 | 6/1992 | McClure | 364/550 |
| 5,220,529 | 6/1993 | Kohiyama et al. | 365/189.01 |
| 5,222,047 | 6/1993 | Matsuda et al. | 365/230.03 |
| 5,228,002 | 7/1993 | Huang | 365/221 |
| 5,262,996 | 11/1993 | Shiue | 362/221 |
| 5,265,063 | 11/1993 | Kogure | 365/233 |
| 5,274,600 | 12/1993 | Ward et al. | 365/221 |
| 5,278,956 | 1/1994 | Thomsen et al. | 395/250 |
| 5,305,253 | 4/1994 | Ward | 365/73 |
| 5,311,475 | 5/1994 | Huang | 365/221 |
| 5,315,184 | 5/1994 | Benhamida | 307/518 |
| 5,317,756 | 5/1994 | Komatsu et al. | 395/800 |
| 5,325,487 | 6/1994 | Au et al. | 395/250 |
| 5,336,938 | 8/1994 | Sywyk | 307/265 |
| 5,345,419 | 9/1994 | Fenstermaker et al. | 365/189.04 |
| 5,365,485 | 11/1994 | Ward et al. | 365/221 |
| 5,367,486 | 11/1994 | Mori et al. | 365/189.05 |
| 5,375,092 | 12/1994 | Taniguchi et al. | 365/221 |
| 5,381,126 | 1/1995 | McClure | 340/146.2 |
| 5,384,744 | 1/1995 | Lee | 365/221 |
| 5,404,332 | 4/1995 | Sato et al. | 365/201 |
| 5,406,273 | 4/1995 | Nishida et al. | 340/825.51 |
| 5,406,554 | 4/1995 | Parry | 370/58.1 |
| 5,412,611 | 5/1995 | Hattori et al. | 365/221 |
| 5,426,612 | 6/1995 | Ichige et al. | 365/220 |
| 5,467,319 | 11/1995 | Nusinov et al. | 365/231 |
| 5,471,583 | 11/1995 | Au et al. | 395/250 |
| 5,473,756 | 12/1995 | Traylor | 395/250 |
| 5,487,049 | 1/1996 | Hang | 365/221 |
| 5,490,257 | 2/1996 | Hoberman et al. | 395/427 |
| 5,495,451 | 2/1996 | Cho | 365/221 |
| 5,502,655 | 3/1996 | McClure | 364/550 |
| 5,506,809 | 4/1996 | Csoppenszky et al. | 365/221 |
| 5,506,815 | 4/1996 | Hsieh et al. | 365/230.03 |
| 5,508,679 | 4/1996 | McClure | 340/146.2 |
| 5,513,318 | 4/1996 | van de Goor et al. | 395/185.01 |
| 5,515,330 | 5/1996 | Hattori et al. | 365/221 |
| 5,519,701 | 5/1996 | Colmant et al. | 370/60.1 |
| 5,521,876 | 5/1996 | Hattori et al. | 365/221 |
| 5,528,553 | 6/1996 | Saxena | 365/230.01 |
| 5,546,347 | 8/1996 | Ko et al. | 365/221 |
| 5,557,575 | 9/1996 | Lee | 365/221 |
| 5,587,962 | 12/1996 | Hashimoto et al. | 365/230.09 |
| 5,619,681 | 4/1997 | Benhamida et al. | 395/500 |
| 5,623,449 | 4/1997 | Fischer et al. | 365/221 X |
| 5,625,842 | 4/1997 | Dalrymple | 395/842 |
| 5,627,797 | 5/1997 | Hawkins et al. | 326/46 X |
| 5,636,176 | 6/1997 | Hashimoto et al. | 365/233 |
| 5,642,318 | 6/1997 | Knaack et al. | 365/201 |

OTHER PUBLICATIONS

Andrew Hawkins et al., U.S.S.N. 08/578,209 Programmable Read–Write Word Line Equality Signal Generation for FIFOs, filed Dec. 29, 1995.

Pidugu Narayana et al., U.S.S.N. 08/615,718 Signal Generation Decoder Circuit and Method, filed Mar. 13, 1996.

P. Forstner, FIFOs With a Word Width of One Bit, First–In, First–Out Technology, Mar. 1996, pp. 1–24.

T. Jackson, FIFO Memories: Solution to Reduce FIFO Metastability, First–In, First–Out Technology, Mar. 1996, pp. 1–6.

T. Jackson, Advanced Bus–Matching/Byte–Swapping Features for Internetworking FIFO Applications, Mar. 1996, pp. 1–3, 5–12.

T. Jackson, Parity–Generate and Parity–Check Features for High–Bandwidth–Computing FIFO Applications, Mar. 1996, pp. 1–3, 5–8.

T. Ishii et al., High–Speed, High–Drive SN74ABT7819 FIFO, Mar. 1996, pp. 1–3, 5–12.

C. Wellheuser et al., Internetworking the SN74ABT3614, Mar. 1996, pp. 1–21.

C. Wellheuser, Metastability Performance of Clocked FIFOs, 1996, pp. 1–3, 5–12.

K. Kittrell, FIFO Solutions for Increasing Clock Rates and Data Widths, First–In, First–Out Technology, 1996, pp. 1–3, 5–9.

K. Kittrell, 1K×9X2 Asynchronous FIFOs SN74ACT2235 and SN74ACT2236, Sep. 1995, 1–3,5–9 (p4 is blank).

FULL AND EMPTY FLAG GENERATOR FOR SYNCHRONOUS FIFOS

CROSS-REFERENCE TO RELATED APPLICATIONS

This application is a continuation-in-part application of Ser. No. 08/572,623, filed Dec. 14, 1995 and now U.S. Pat. No. 5,627,797.

FIELD OF THE INVENTION

This invention relates to FIFO buffers generally and more particularly to an asynchronous state machine design to generate full and empty flags in synchronous FIFO buffers.

BACKGROUND OF THE INVENTION

A synchronous first-in first-out (FIFO) buffer includes logic indicating when the FIFO is full or empty. In a typical synchronous FIFO full and empty status flags are updated by a single clock, either a read clock or a write clock. The logic to generate the full and empty flags typically consists of counters, adders, combinatorial logic to generate a so called internal full−1(empty+1)flag and a final output register. An alternate way to generate the internal full flag is by directly decoding the counter outputs using combinatorial logic. The register is typically a master-slave register. The register architecture may use both the look-ahead internal flag (full−1 or empty+1) and the non look-ahead internal flag (full or empty) or just the internal look-ahead flag. The register architectures which use both look-ahead and non look-ahead flags are simple, whereas the architectures which use only one internal flag have a complex resetting mechanism of the master-slave after the first read or the first write. Typically the full or empty flag is updated by the write or read clock.

The minimum delay between the clocks is defined as a tSKEW delay. The updating clock, either the write or read clock, is guaranteed to recognize the second clock, either the read or write clock, if it occurs at least tSKEW delay ahead of the updation clock. If the second (read) clock occurs within tSKEW time from the updation clock (write), the updation clock may or may not recognize the second clock.

In a counter/adder decode method there are two counters, one each for the read and write clocks. These two counters are reset to zero upon master reset and are incremented based only on their respective clocks. The outputs of these counters are fed into a subtractor that perform Wcount-Rcount, or the difference between the number of locations written and the number of locations read. This difference is then fed into combinatorial logic to determine if the FIFO is full or full−1 (empty or empty+1). The combinatorial logic output is used as the input to the D-register which is clocked by the appropriate external clock.

Another method, called the direct decode method, uses the counters just like the counter/adder method. Instead of having a subtractor on the outputs, combinatorial logic is used to decode when the FIFO is full. This is done by taking the exclusive-OR (XOR) of the Wcount and the Rcount. This combinatorial logic can be arrived at by generating the truth table for the full (empty) flag with respect to the Wcount and Rcount input variables. This direct decode method greatly reduces the amount of logic required to generate an internal full status flag and improves the tSKEW delay.

The output register architectures which make use of both the look-ahead and non look-ahead internal flags are simple. These architectures have a multiplexer that is used to select either the free running clock or the enable clock. This selection is done by the output of the slave register.

The other alternate register implementation is accomplished exclusively with the internal look-ahead flag. The register receives the clock as long as the external flag is not active. When the external flag goes active, indicating a boundary condition, the master and slave registers are frozen by special logic. After the first read (full) or write (empty) the next clock resets the master and slave registers and enables the register clock. The reset logic design is typically very involved and complex.

All the above architectures suffer from very high tSKEW delays (~8–10 Gate Delays). Additionally these architectures also suffer from metastabilty problems introduced by the register trying to sample the asynchronous internal flag which is updated by both the asynchronous read and write clocks. The present invention solves both of these issues by providing very high MTBF and very short, even 0ns tSKEW. Additionally the present invention gives designers the flexibility to program the tSKEW to any desired value, including a 0ns tSKEW. The synchronous FIFO's require a flag updation cycle at the empty and full boundaries. Typically the fall through read timing (read after the first write), which is the worst, defines the clocking frequency. Although the flexibility to program the tSKEW to 0ns is idealistic, the tSKEW does need to be programmed based on the fall through timing, which typically results in higher tSKEW requirements.

SUMMARY OF THE INVENTION

The present invention provides an asynchronous state machine with a programmable tSKEW that is used to generate a synchronous empty or full flag in a synchronous FIFO buffer. The present invention accomplishes this by using a set state machine which can make the external flag go low, or active, and a reset state machine which can only make the external flag go high, or inactive. The functioning of the set state machine and the reset state machine is controlled by a blocking logic. The output of each of the state machine drives a set-reset (SR) latch. The output of the SR latch is presented to an input of the blocking logic, which is used to control the mutual exclusion of the state machines.

Objects, features and advantages of the present invention are to provide a system for generating a synchronous empty or full flag for use with synchronous FIFO buffers. The system produces the desired flags with extremely low tSKEW, can break the conventional tSKEW barrier of eight-ten gate delays, and can be programmed to produce any desired tSKEW delay all the way from 0ns.

It is another object of the present invention to provide a system for producing synchronous full and empty flags that can be ported to other technologies with minimal effort, can produce a consistent tSKEW delay that is independent of the size of the FIFO buffer, has a very high MTBF, can be used for the generation of both synchronous empty and full flags, requires less simulation when compared to prior art techniques and handles all the possible asynchronous clock transitions successfully.

BRIEF DESCRIPTION OF THE DRAWINGS

These and other objects, features and advantages of the present invention will be apparent from the following detailed description and the appended claims in which:

DETAILED DESCRIPTION OF THE PREFERRED EMBODIMENTS

Figure 1:
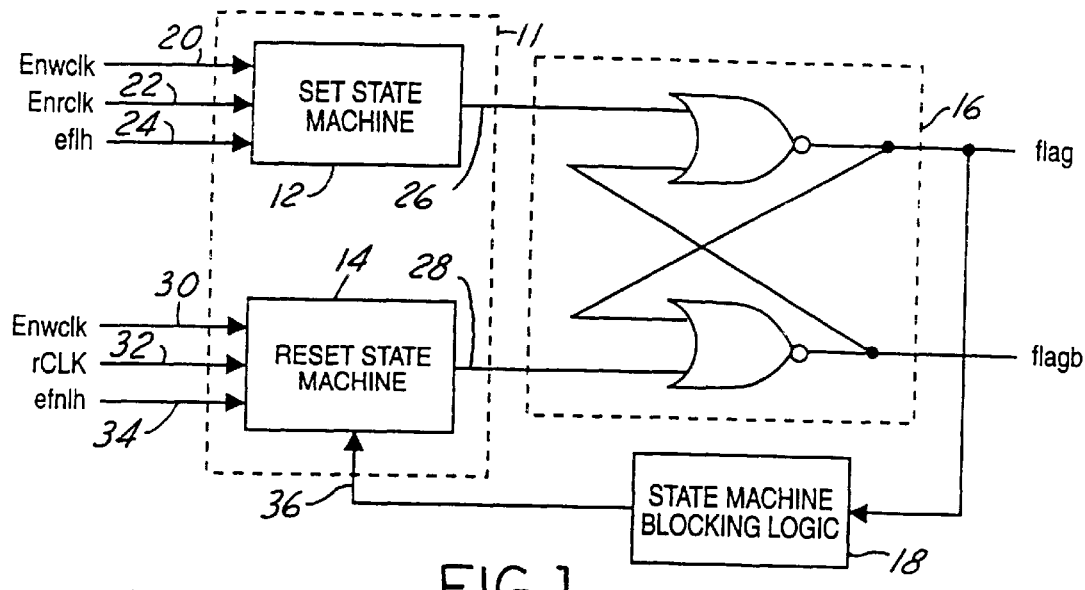
FIG. 1 is a block diagram of the overall flag generation architecture.

Referring to FIG. 1, a block diagram of the overall architecture of the flag generator 10 is shown. The flag generator 10 generally comprises a state machine block 11, a set state machine 12, a reset state machine 14, a latch 16 and a blocking logic block 18. The set state machine 12 has a first input 20 that receives a signal Enwclk which represents an enabled write clock, a second input 22 that receives a signal Enrclk which represents an enabled read clock and a third input 24 that receives a signal Eflh which represents a look-ahead empty signal. The enabled read clock Enrclk and the enabled write clock Enwclk each drive a counter. Each of these counters have two built-in subcounters. A first subcounter is an exact subcounter and starts counting from zero after a reset signal. A second subcounter is a plus one counter that starts counting from a one after a reset. A look-ahead empty signal Eflh, is a signal that is generated externally from the state machines 12 and 14, but internally to the FIFO (not shown) and is a result of a bitwise exclusive OR of the plus one read subcounter and the exact write subcounter. The flag output of the latch 16 represents an empty flag (or full flag) indicating when the FIFO is either empty (or full). When the set output 26 is active the reset state machine 14 is enabled. Similarly, the set state machine 12 is enabled when the external empty (or full) flag is inactive. The blocking logic block 18 controls the mutual exclusion of the state machine 12 and 14. The set output 26 can only provide a flag signal that sets the latch 16. The latch 16 will remain in a set state until the reset state machine provides an output 28 that resets the latch 16.

The reset state machine 14 has a first input 30 that receives the enabled write clock signal Enwclk, a second input 32 that receives a free running read clock rCLK and a third input 34 that receives a non-look-ahead empty signal Efnlh. The non-look-ahead empty signal Efnlh is a signal that is generated externally from the state machines 12 and 14, but internally to the FIFO (not shown) and is a result of a bitwise exclusive OR of the exact read subcounter and the exact write subcounter.

The signals rCLK and wCLK are each free running externally generated clocks. The actual reading (or writing) is performed by additionally providing a synchronous read (write) enable input signal to the FIFO. When the enable input is active in a clock cycle, internally to the FIFO, an enabled read (write) clock is generated. These are represented by the Enrclk (Enwclk) inputs to the state machine.

The reset state machine 14 produces the reset output 28 that resets the latch 16. The reset state machine 14 also has a fourth input 36 that receives a signal from the blocking logic block 18. The blocking logic block 18 controls the functioning of the reset state machine 14. As a result, the reset state machine 14 only produces a reset output 28 when the FIFO is empty. In contrast, no additional logic is required to control the set state machine 12 because, unlike the reset state machine 14, the set state machine 12 has an enabled read clock Enrclk as an input at input 22. The result is that the activity of each of the state machines 12 and 14 is mutually exclusive. While the set machine 12 is active, the reset state machine 14 is frozen by the blocking logic block 18. The latch 16 receives the set output 26 and the reset output 28 and produces an output signal flag and an output signal flagb. The output flag is updated by the enabled read clock Enrclk present at the second input 22 of the state machine 12. A programmed tSKEW delay can be achieved by delaying the enabled write clock Enwclk present at the input 22 of the set state machine 12. This programming feature will be more apparent after reading the description of FIG. 2.

Figure 2:
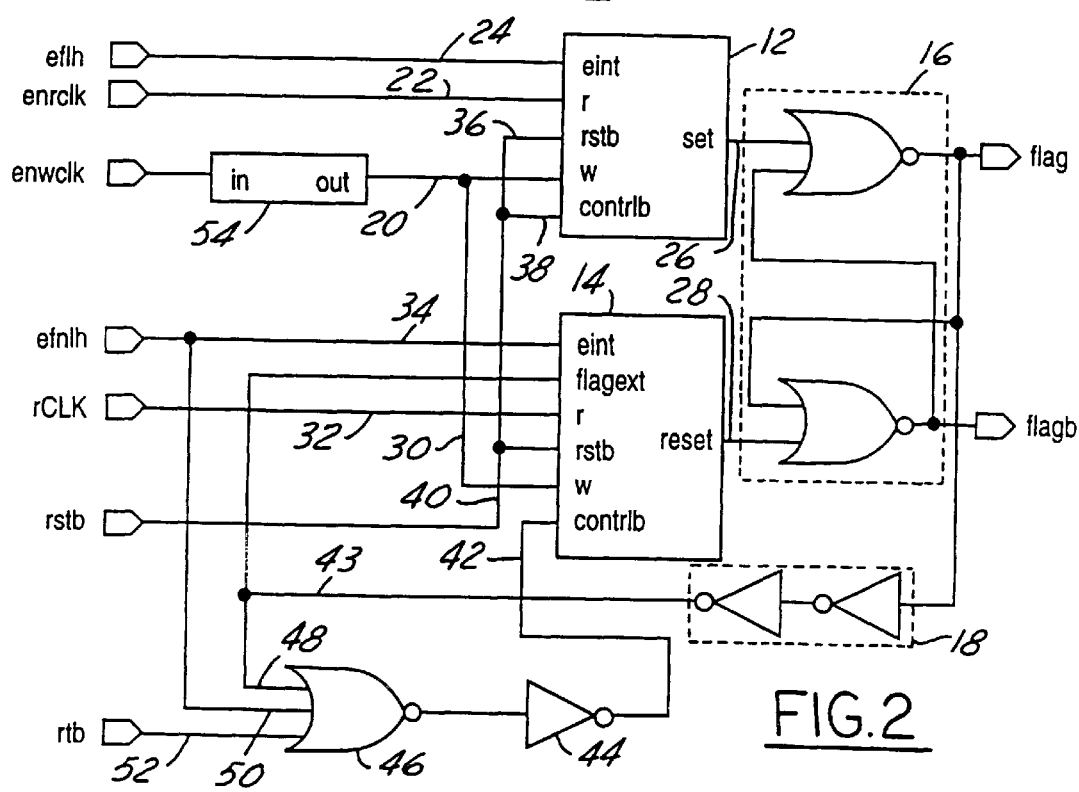
FIG. 2 is a top level block diagram of the empty flag generation logic.

Referring to FIG. 2, a more detailed block diagram of the flag generator 10 is shown. The set state machine 12 receives the first, second and third inputs 20, 22 and 24, as well as a fourth input 36 that represents an external reset input Rstb as a control signal input Cntrlb. The input Rstb is an active low input. The set state machine 12 also has a fifth input 38 that also receives the external master reset input Rstb. The reset state machine 14 receives the first, second and third inputs 30, 32 and 34. The reset state machine 14 has a fourth input 40 that receives an input from the external master reset signal Rstb. The reset state machine 14 also has a fifth input 42 that receives a control signal Cntrlb from an inverter 44. The reset state machine receives a sixth input 43, representing an external flag signal flagext, from the blocking logic block 18. The inverter 44 receives a signal from a NOR gate 46. The NOR gate 46 has a first input 48 that receives a signal from the output 43 of the blocking logic 18, a second input 50 from the non-look-ahead empty flag Efnlh and a third input 52 which receives a signal Rtb that represents an external retransmit signal. The external retransmit signal Rtb and the external master reset signal Rstb are additional input signals (not shown in FIG. 1) that provide a means to reset the flag generator 10 from an external source.

The first input 20 of the set state machine 12 and the first input 30 of the reset state machine 14 can be delayed through a tSKEW programming block 54, which provides a programmable delay. The programmable delay can be implemented either electronically, or through discrete digital components, such as inverters. Regardless of the delay system used, the presence of a delay from the tSKEW programming block 54 makes the tSKEW delay programmable by the designer to fit any particular design requirements. If no tSKEW delay is desired, the tSKEW programming block 54 can be eliminated. The flag generator 10 can also be used to generate a full flag by adjusting the retransmit and reset logic to suit the design specification of a full flag.

Figure 3:
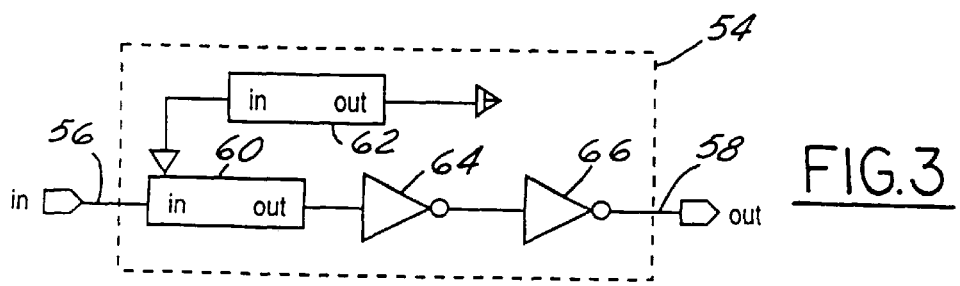
FIG. 3 is a block diagram of the programmable tSKEW delay.

Referring to FIG. 3, the tSKEW programming block 54 is shown in greater detail. The tSKEW programming block 54 has an input 56 that receives the signal from the enable write clock Enwclk and an output 58 that is received by the first input 20 of the set machine 12. The input 56 is received by a gate delay block 60 that provides a programmable amount of delay. The gate delay block 60 produces a signal that is cascaded through an inverter 64 and an inverter 66 produce the output 58.

Figure 4:
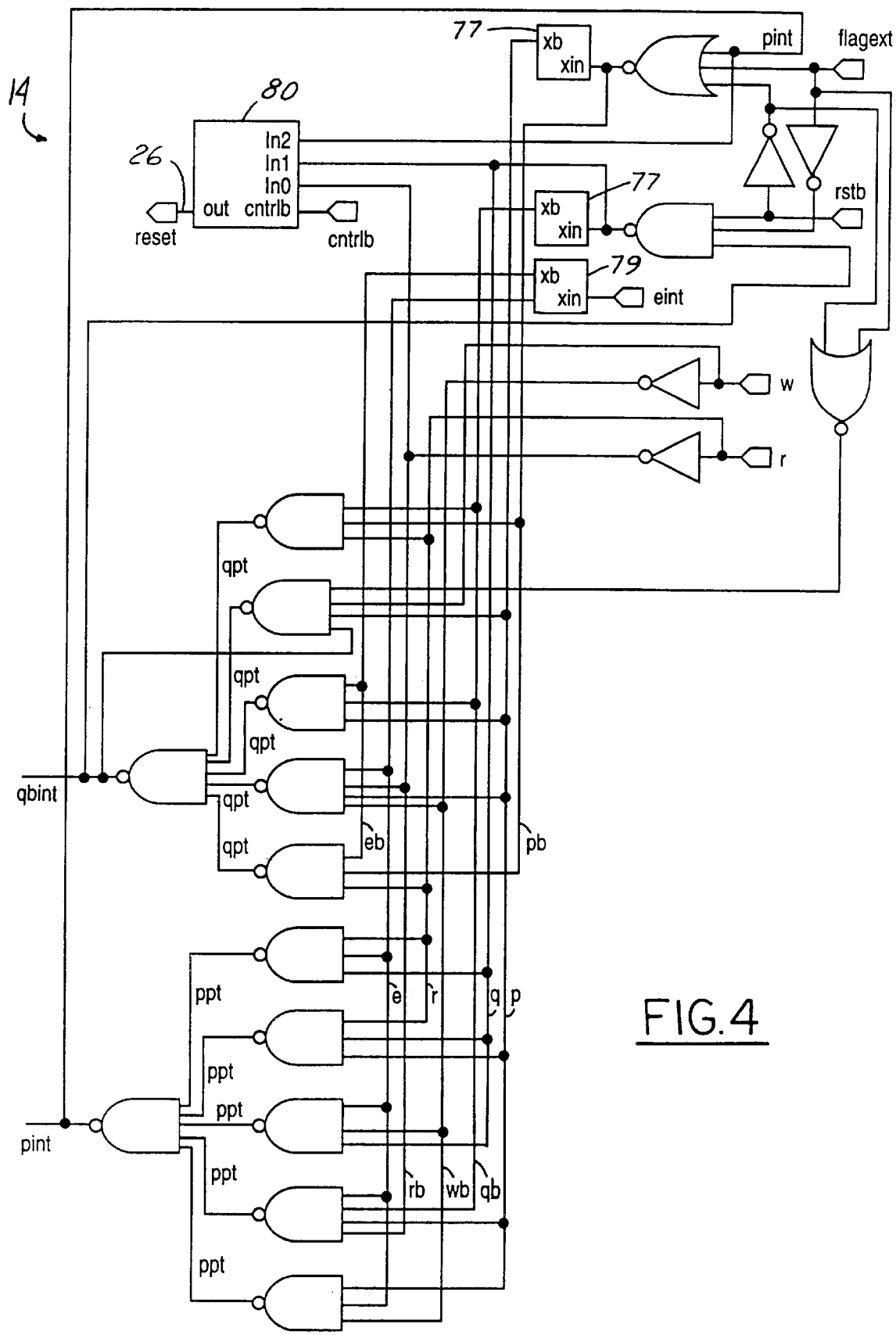
FIG. 4 is a diagram of the reset state machine.

Referring to FIG. 4, a detailed schematic of the reset state machine 14 is shown. The reset state machine 14 has an input W, R, Eint, Rstb, Flagext and Cntrib that represent the inputs 30, 32, 34, 40, 43 and 42 shown in FIG. 2. The reset state machine 14 has a set of digital logic gates that perform the desired output function. The input Cntrib is received by a control block 80 that produces the output 26. The control block 80 processes information necessary to produce a reset and retransmit. FIG. 4 also includes blocks 77 (that are described in connection with FIG. 6A) and a block 79 (that is described in connection with FIG. 6C).

Figure 5:
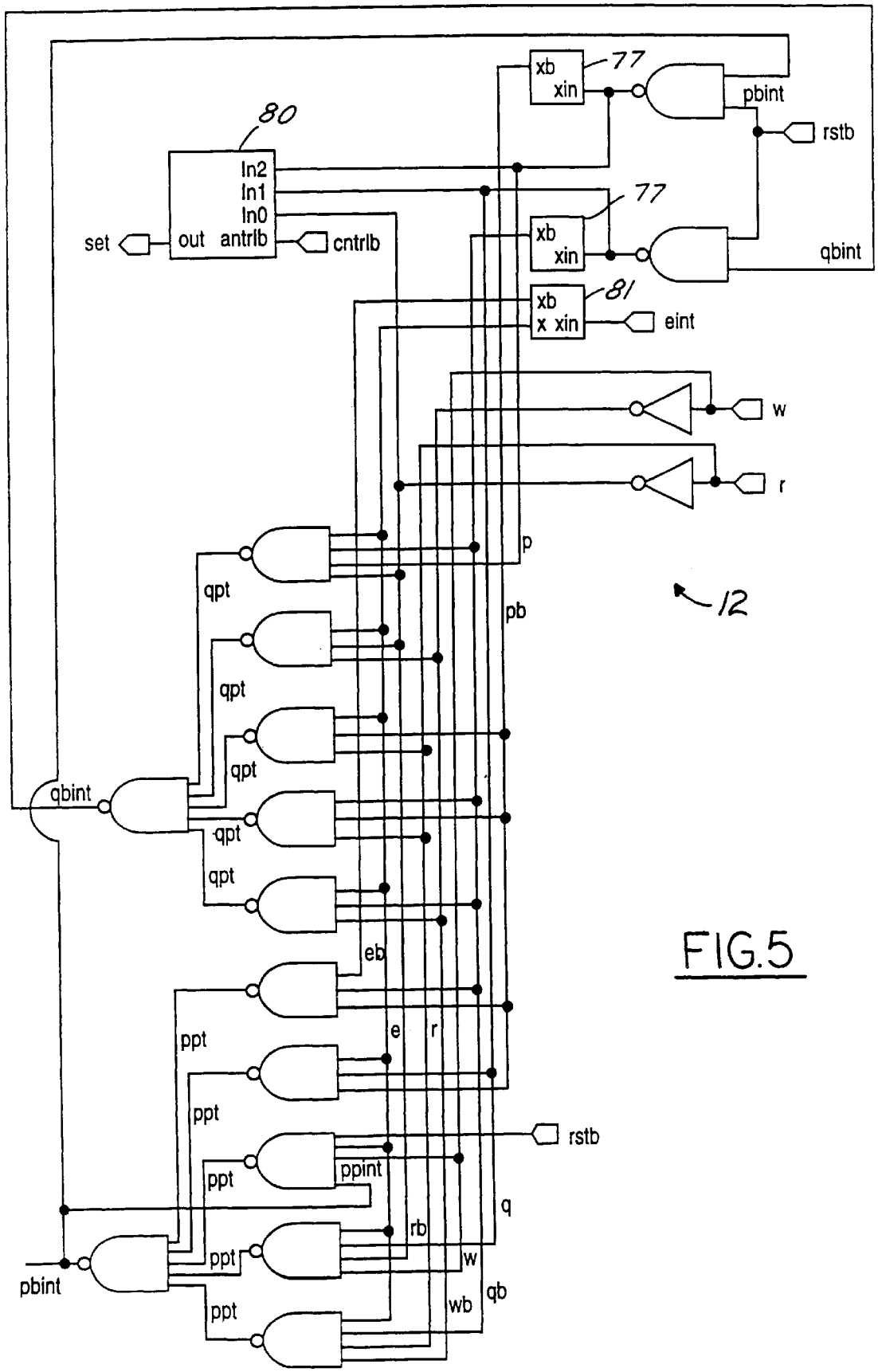
FIG. 5 is a schematic diagram of the set state machine.

Referring to FIG. 5, a detailed schematic of the set state machine 12 is shown. The set state machine 12 has inputs W, R, Eint, Rstb and Cntrlb. The set state machine 12 also has a control block 80 which functions identically to the control block 80 in FIG. 4. The set state machine 12 of FIG. 5 uses non-overlapping clock generator blocks 77 (that are described in connection with FIG. 6A) to produce true and complement signals of necessary internal signals. The set state machine 12 of FIG. 5 also includes a block 81 (that is described in connection with FIG. 6B).

Figure 6A:
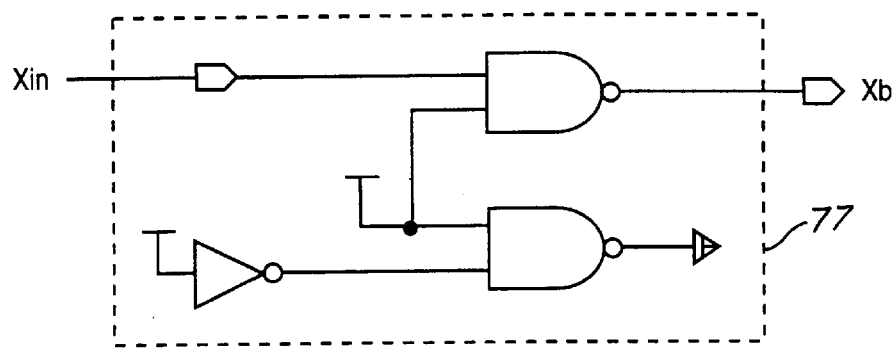
FIGS. 6A–6C are diagrams of the non-overlapping logic used for the clock generator state variables.
Figure 6B:
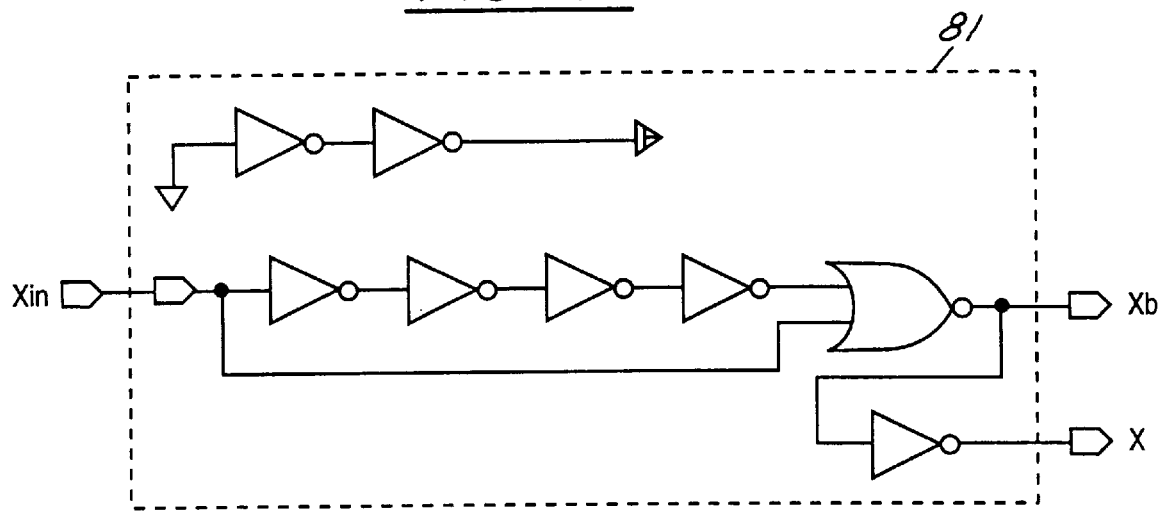
Figure 6C:
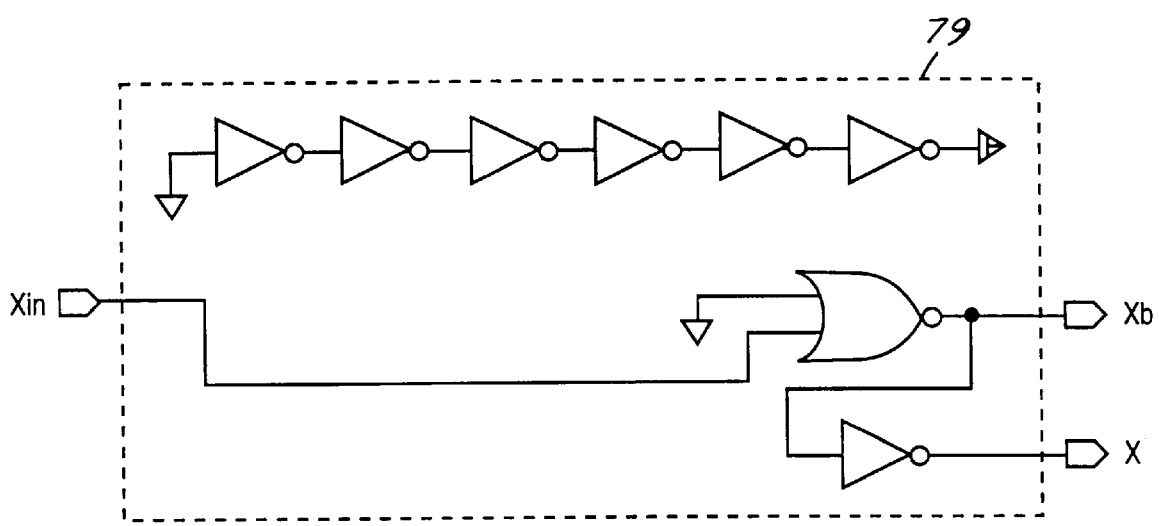

Referring to FIGS. 6A, 6B and 6C logic level diagrams showing the blocks 77, 79 and 81 is shown. Each of the FIGS. 6A–C comprise of a generic input labeled Xin and a generic output Xb. FIGS. 6B and 6C also include an output X that is equal to Xin. Each of the FIGS. 6A–6C comprise discrete logic components. It should be appreciated that any method of providing a true and complement signal can be used in place of FIGS. 6A–6C without departing from the spirit of the invention.

Figure 7:
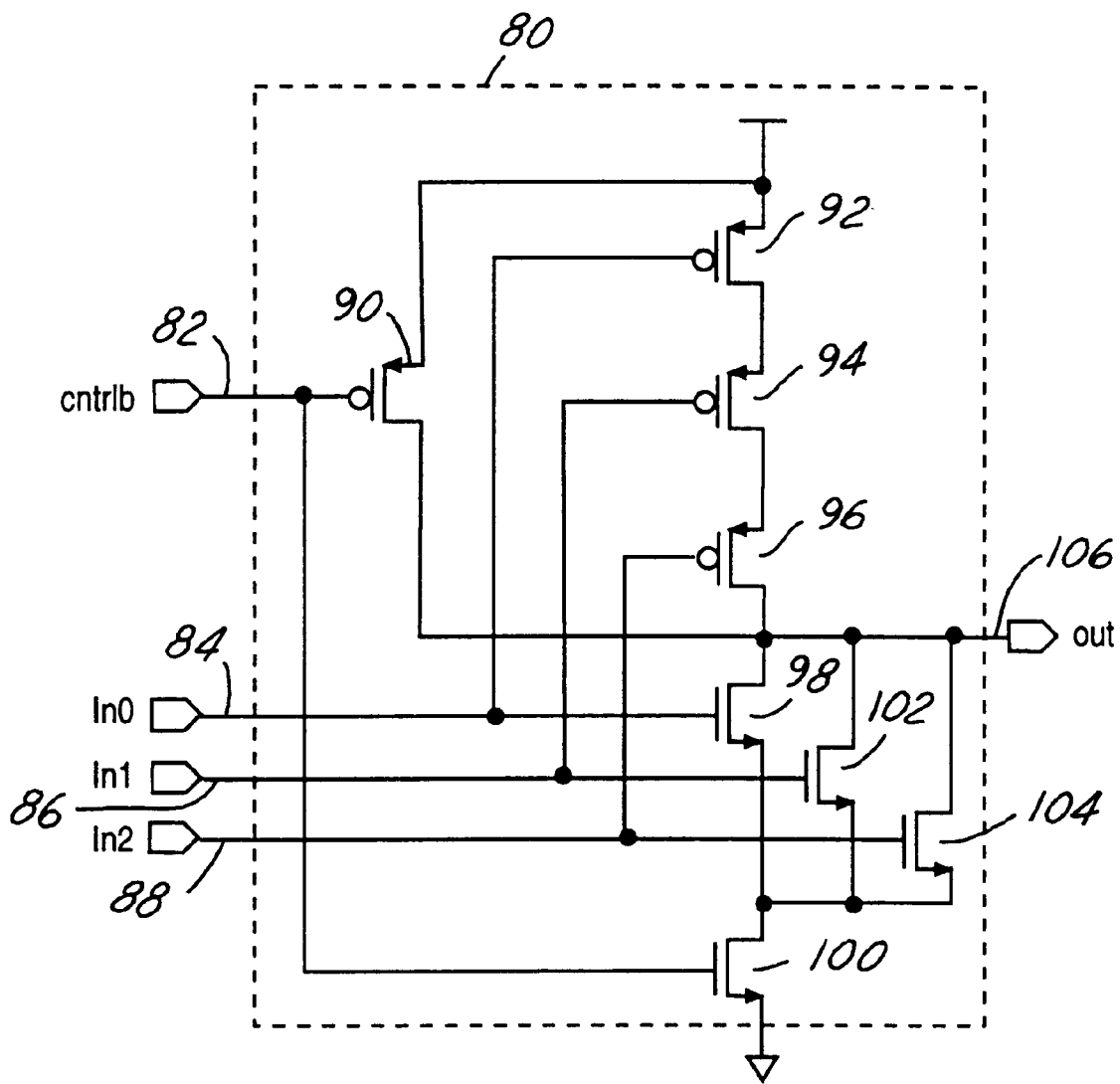
FIG. 7 is a schematic diagram of the logic used to produce the reset and retransmit functions.

Referring to FIG. 7, the control block 80 is shown in greater detail. The control block 80 has a first input 82 that receives a signal cntrib, a second input 84 that receives a signal IN0, a third input 86 that receives a signal IN1 and a fourth input 88 that receives a signal IN2. The control block 80 comprises a transistor 90, a transistor 92, a transistor 94, a transistor 96, a transistor 98, a transistor 100, a transistor 102 and a transistor 104. The first input 82 is received by an inverted input of the transistor 90 as well as an input of the transistor 100. The second input 84 is received by an inverted input of the transistor 92 as well as an input of the transistor 98. The third input 86 is received by an inverted input of the transistor 94 as well as an input of the transistor 102. The fourth input 88 is received by an inverted input of the transistor 96 as well as an input of the transistor 104. The gates and sources of the transistors 92, 94, 96, 98 and 100 are cascaded together. The source of the transistor 92 is connected to the source of the transistor 90. The drain of the transistor 90 is coupled with the source of the transistor 98, the source of the transistor 102, the source of the transistor 104 and the drain of the transistor 96 to provide an output 106.

The logic of the set state machine 12 is illustrated by the following Table 1:

TABLE 1

| Row # | 000 | 001 | 011 | 010 | 110 | 111 | 101 | 100 | Set |
|---|---|---|---|---|---|---|---|---|---|
| 0 | 0 | 1* | 2 | 3* | 4 | 5 | 6 | 7* | 1 |
| 1 | 0* | 1 | 2* | 3 | 4 | 5 | 6* | 7 | 1 |
| 2 | 0 | 1* | 2 | 3* | 4 | 5* | 6 | 7 | 1 |
| 3 | 0* | 1 | 2* | 3 | 4* | 5 | 6 | 7 | 1 |
| 4 | 0 | 1 | 2 | 3* | 4 | 13* | 14* | 7* | 1 |
| 5 | 0 | 1 | 2* | 3 | 4* | 5 | 6* | 7 | 1 |
| 6 | 0 | 1* | 2 | 3 | 4 | 5* | 6 | 7* | 1 |
| 7 | 0* | 1 | 2 | 3 | XX* | 5 | 14* | 7 | 1 |
| 8 | 0 | 9* | 10 | 3* | 4 | 13 | 14* | 7* | 0 |
| 9 | 0* | 9 | 10* | 3 | 4 | 13 | 14* | 7 | 0 |
| 10 | 0 | 9* | 10 | 3* | 4 | 13* | 14 | 7 | 0 |
| 11 | 0* | 9 | 10* | 3 | 4* | 13 | 14 | 7 | 0 |
| 12 | 0 | 9 | 10 | 3* | 4 | 13* | 14 | 7* | 0 |
| 13 | 0 | 9 | 10* | 3 | 4* | 13 | 14* | 7 | 0 |
| 14 | 0 | 9* | 10 | 3 | 4 | 13* | 14 | 7* | 0 |
| 15 | 0* | 9 | 10 | 3 | 4* | 13 | 14* | 7 | 0 |

The individual columns are labeled as a three bit binary value where the first bit, when the flag generator 10 is configured to generate an empty flag, represents the look-ahead empty signal Eflh, the second bit represents the enabled write clock Enwclk and the third bit represents the enabled read clock Enrclk. The column labeled Set represents the decoded output of the set state machine 12.

A specified version of TABLE 1 where redundant states are eliminated is shown in the following TABLE 2:

TABLE 2

| Row # | 000 | 001 | 011 | 010 | 110 | 111 | 101 | 100 | Set |
|---|---|---|---|---|---|---|---|---|---|
| 0–3,5,6(a) | A | A | A | A | b | A | A | c | 1 |
| 4(b) | a | a | a | a | B | d | d | d(c) | 1 |
| 7(c) | a | a | a | a | C | a | d | C | 1 |
| 8–15(d) | b(a | D | D | b(a) | b | D | D | c | 0 |

Similar to the logic of the set state machine 12 shown in TABLE 2, the logic of the reset state machine 14 is illustrated by the following TABLE 3:

TABLE 3

| Row # | 000 | 001 | 011 | 010 | 110 | 111 | 101 | 100 | Reset |
|---|---|---|---|---|---|---|---|---|---|
| 0 | 0 | 9* | 10 | 3* | 4 | 5 | 6 | 7* | 1 |
| 1 | 0* | 9 | 10* | 3 | 4 | 5 | 6* | 7 | 1 |
| 2 | 0 | 9* | 10 | 3* | 4 | 5* | 6 | 7 | 1 |
| 3 | 0* | 9 | 10* | 3 | 4* | 5 | 6 | 7 | 1 |
| 4 | 0 | 9 | 10 | 3* | 4 | 5* | 6* | 7* | 1 |
| 5 | 0 | XX | XX* | 3 | 4* | 5 | 6* | 7 | 1 |
| 6 | 0 | XX* | XX | 3 | 4 | 5* | 6 | 7* | 1 |
| 7 | 0* | 9 | 10 | 3 | YY* | 13 | 6* | 7 | 1 |
| 8 | 0 | 9* | 10 | 3* | 4 | 13 | 14 | 7* | 0 |
| 9 | 0* | 9 | 10* | 3 | 4 | 13 | 14* | 7 | 0 |
| 10 | 0 | 9* | 10 | 3* | 4 | 13* | 14 | 7 | 0 |
| 11 | 0* | 9 | 10* | 3 | 4* | 13 | 14 | 7 | 0 |
| 12 | 0 | 9 | 10 | 3* | 4 | 13* | 14 | 7* | 0 |
| 13 | 0 | 9 | 10* | 3 | 4* | 13 | 14* | 7 | 0 |
| 14 | 0 | 9* | 10 | 3 | 4 | 13* | 14 | 7* | 0 |
| 15 | 0* | 9 | 10 | 3 | 4* | 13 | 14* | 7 | 0 |

The individual columns are similarly labeled. The first bit, when the state machine 10 is configured to generate an empty flag, represents the non look-ahead empty signal Efnlh, the second bit represents the enabled write clock Enrclk and the third bit represents the free running read clock rCLK. The column labeled Reset represents the decoded output of the reset state machine 14.

A simplified version of TABLE 3 where the redundant states are eliminated is shown in the following TABLE 4:

TABLE 4

| Row # | 000 | 001 | 011 | 010 | 110 | 111 | 101 | 100 | Reset |
|---|---|---|---|---|---|---|---|---|---|
| 0–4(a) | A | d | d | A | a | b | b | b(c) | 1 |
| 5,6(b) | a | b | b | a | a | B | B | c | 1 |
| 7(c) | d(a) | d | d | d(a) | C | d | b | C | 1 |
| 8–15(d) | a | D | D | a | a | D | D | c | 0 |

When the flag generator 10 is configured to generate a full flag the bits of the columns of TABLES 1–4 represent the same signals, but at different locations. Specifically, when the flag generator 10 is configured to generate a full flag, the first bit of TABLE 1 and 2 represents the look-ahead full signal Eflh, the second bit represents the enabled read clock Enrclk and the third bit represents the enabled write clock Enwclk. The first bit of TABLE 3 and 4 represents the non-look-ahead full signal Efnlh, the second bit represents the enabled read clock Enrclk and the third bit represents the free running write clock wCLK.

The present invention uses the set state machine 12 and the reset state machine 14 that each handle two input clocks and a look-ahead signal. Each of the state machines 12 and 14 has four possible output states, as illustrated in TABLES 2 and 4. With design criteria requiring five input variables and eight output states, the implementation of two input state machines 12 and 14 is far less complex than the implementation of a single state machine capable of handling all combinations. Furthermore, the blocking logic block 18 is insignificant enough to maintain the simplicity of the set/reset implementation of the present invention. While the use of smaller, more efficient state machines 12 and 14 is superior using a single more complex state machine, the present invention can be implemented using a single larger state machine without departing from the spirit of the present invention.

While the invention has been particularly shown and described with reference to preferred embodiments thereof, it will be understood by those skilled in the art that various changes in form and details may be made without departing from the spirit and scope of the invention.

We claim:

1. A state machine comrprising:
   a first input receiving a write clock, a second input receiving a read clock, a third input receiving a look-ahead signal, a fourth input receiving a non look-ahead signal and a fifth input receiving a free running read clock, said state machine manipulating said inputs to produce an output that is at a one logic state when a FIFO is empty and is at another logic state when said FIFO is not empty.

2. An apparatus comprising:
   a first state machine having a first input receiving a write clock, a second input receiving a first read clock and a third input receiving a look-ahead signal, said first state machine manipulating said inputs to produce a first output signal that is either at a first logic state or at a second logic state;
   a second state machine having a first input receiving said write clock, a second input receiving a second read clock, a third input receiving a non look-ahead signal and a fourth input for receiving control information, said second state machine manipulating said inputs to produce a second output signal that is either at a first logic state or at a second logic state;
   a latch having a first input receiving said first output signal, a second input receiving said second output signal, a third output signal equal to said first output signal and a fourth output signal equal to said second output signal, said latch for holding said third and fourth output signals until said first and second output signals change logic states, said fourth output signal representing an output flag that is at one logic state when said FIFO is empty and is at another logic state when said PIFO is not empty; and
   logic means having a logic input receiving said third output signal of said latch and an output presenting said fourth input to said second state machine, said logic means uses said logic input to produce said control information.

3. The apparatus according to claim 2 wherein said empty flag is a full flag that is at one logic state when said FIFO is full and is at another logic state when said FIFO is not full.

4. The apparatus according to claim 2 wherein said FIFO is a synchronous FIFO.

5. The apparatus according to claim 2 wherein said first read clock is an enabled read clock.

6. The apparatus according to claim 2 wherein said write clock is an enabled write clock.

7. The apparatus according to claim 2 wherein said second read clock is a free running read clock.

8. The apparatus according to claim 2 further comprising delay means having an input receiving said write clock and an output being presented to said first input of said first state machine, said delay means provides a predetermined delay to said first input of said state machine producing a tsKRW delay in said output signal.

9. The apparatus according to claim 8 wherein said predetermined delay is determined during fabrication.

10. The apparatus according to claim 8 wherein said predetermined delay is programmable.

11. An apparatus comprising:
    delay means having an input receiving a write clock and a delay output, said delay means provides a predetermined delay to said delay output;
    a first state machine having a first input receiving said delay output, a second input receiving a first read clock and a third input receiving a look-ahead signal, said first state machine manipulating said inputs to produce a first output that is either at a first logic state or at a second logic state;
    a second state machine having a first input receiving said write clock, a second input receiving a second read clock, a third input receiving a non look-ahead signal and a fourth input for receiving control information, said state machine manipulating said inputs to produce a second output that is either at a first logic state or at a second logic state;
    a latch having a first input receiving said first output, a second input receiving said second output, a third output signal equal to said first output and a fourth output signal equal to said second output, said latch for holding said second and third output signals until said first and second outputs change states, said third output signal representing an output flag that is at one logic state when said FIFO is empty and is at another logic state when said FIFO is not empty; and
    logic means having an input receiving said fourth output signal of said latch and an output presenting said fourth input of said second state machine, said logic means uses said input to produce said control information.

12. The apparatus according to claim 11 wherein said empty flag is a full flag that is at one logic state when said FIFO is full and is at another logic state when said FIFO is not full.

13. The apparatus according to claim 11 wherein said FIFO is a synchronous FIFO.

14. The apparatus according to claim 11 wherein said first read clock is an enabled read clock.

15. The apparatus according to claim 11 wherein said write clock is an enabled write clock.

16. The apparatus according to claim 11 wherein said second read clock is a free running read clock.

17. The apparatus according to claim 11 wherein said predetermined delay is determined during fabrication.

18. The apparatus according to claim 11 wherein said predetermined delay is programmable.

19. The apparatus according to claim 18 wherein said predetermined delay is electronically programmable in response to an externally generated signal.

20. The apparatus according to claim 18 wherein said predetermined delay is programmable to a value as small a no delay.

21. A state machine comprising:
a first input receiving a write clock, a second input receiving a read clock, a third input receiving a look-ahead signal, a fourth input receiving a non look-ahead signal and a fifth input receiving a free running read clock, said state machine manipulating said inputs to produce an output that is at a one logic state when a FIFO is full and is at another logic state when said FIFO is not full.

22. An apparatus comprising:
a first state machine receiving a write clock, a first read clock and a look-ahead signal, said first state machine manipulating said write clock, said first read clock and said look-ahead signal to produce a first output signal that is either at a first logic state or at a second logic state;
a second state machine receiving said write clock, a second read clock, a non look-ahead signal and control information, said second state machine manipulating said write clock, said read clock, said non look-ahead signal and said control signal to produce a second output signal that is either at a first logic state or at a second logic state;
a latch receiving said first output signal, said second output signal, a third output signal and a fourth output signal, said latch configured to hold said third and fourth output signals until said first and second output signals change logic states, said fourth output signal representing an output flag that is at one logic state when said FIFO is at a full or empty boundary and is at another logic state when said FIFO is not at said boundary; and
logic means receiving said third output signal of said latch and presenting said control information in response to said third output signal.

23. An apparatus for generating one or more output flags representing the status of a FIFO buffer comprising:
a state machine configured to generate said one or more output flags in response to (i) a write clock, (ii) a read clock, (iii) a look-ahead signal, (iv) a non look-ahead signal and (v) a free running read clock.

24. The apparatus according to claim 23 wherein said one or more output flags comprises a full flag that is at one logic state when said FIFO is full and is at another logic state when said FIFO is not full.

25. The apparatus of claim 23, wherein said one or more output flags comprises an empty flag that is at one logic state when said FIFO is empty and is at another logic state when said FIFO is not empty.

26. The apparatus of claim 23, wherein said one or more output flags comprise an empty flag and a full flag.

27. The apparatus according to claim 23 wherein said FIFO comprises a synchronous FIFO.

28. The apparatus according to claim 23 wherein said non look-ahead signal is a member selected from the group consisting of a read counter and a write counter.

29. An apparatus comprising:
a first state machine configured to generate a first output in response to (i) a write clock, (ii) a first read clock and (iii) a look-ahead signal;
a second state machine configured to generate a second output signal in response to (i) said write clock, (ii) a second read clock, (iii) a non look-ahead signal and (iv) a control signal;
a latch configured to:
(a) receive (i) said first output signal and (ii) said second output signal,
(b) present (i) a third output signal and (ii) a fourth output signal, and
(c) hold said third and fourth output signals until said first and second output signals change logic states, wherein said fourth output signal represents an output flag that is at one logic state when said FIFO is at a full or empty boundary and is at another logic state when said FIFO is not at said boundary; and
a logic circuit configured to present said control signal to said second state machine in response to said third output signal.

30. The apparatus according to claim 29 wherein said first read clock comprises an enabled read clock.

31. The apparatus according to claim 30 wherein said write clock comprises an enabled write clock.

32. The apparatus according to claim 29 wherein said first read clock comprises an enabled read clock and said second read clock comprises a free running read clock.

33. The apparatus according to claim 29 further comprising a delay circuit configured to receive said write clock and present said first read clock to said first state machine, wherein said delay circuit provides a predetermined delay to said first read clock.

34. The apparatus circuit according to claim 33 wherein said predetermined delay is programmable.

35. The apparatus according to claim 29, wherein said second state machine further comprises a delay circuit configured to receive said write clock and generate a delayed write clock having a predetermined delay, wherein said first state machine generates said first output in response to said delayed write clock.

36. The apparatus according to claim 29 wherein said output flag comprises an empty flag that is at one logic state when said FIFO is empty and is at another logic state when said FIFO is not empty.

37. The apparatus according to claim 29 wherein said output flag comprises a full flag that is at one logic state when said FIFO is full and is at another logic state when said FIFO is not full.

38. The apparatus according to claim 29 wherein said look-ahead signal is generated in response to an output of a plus one read and/or a write counter.

39. The apparatus according to claim 32 wherein said free running read clock is an external free running read clock.

40. A method for determining the fullness of a buffer comprising the steps of:
generating one or more output flags in response to (i) a write clock, (ii) a read clock, (iii) a look-ahead signal, (iv) a non look-ahead signal and (v) a free running read clock;
and presenting said write clock, said read clock, said look-ahead signal and said free running read clock to a state machine, wherein said state machine generates said one or more output flags.

\* \* \* \* \*